United States Patent [19]

Hill, III et al.

[11] Patent Number: 4,857,398

[45] Date of Patent: Aug. 15, 1989

[54] ELECTROSENSITIVE RECORDING

[75] Inventors: John A. Hill, III, Milton; Richard G. Miekka, Sudbury; Norman B. Cohen, Wayland, all of Mass.

[73] Assignee: Dennison Manufacturing Company, Framingham, Mass.

[21] Appl. No.: 603,060

[22] Filed: Apr. 23, 1984

Related U.S. Application Data

[63] Continuation of Ser. No. 415,106, Sep. 7, 1982, abandoned.

[51] Int. Cl.⁴ .......................................... G01D 15/34

[52] U.S. Cl. .................................... 428/331; 428/448; 428/457

[58] Field of Search ............... 428/331, 448, 450, 452, 428/457; 348/135.1

[56] References Cited

U.S. PATENT DOCUMENTS

| | | | |
|---|---|---|---|
| 1,955,572 | 4/1934 | Adlar et al. | 428/450 |
| 3,299,433 | 1/1967 | Reis | 346/135.1 |
| 3,492,140 | 1/1970 | Honjo et al. | 346/135.1 |
| 3,658,998 | 4/1972 | Ehrhardt et al. | 428/331 X |
| 3,786,518 | 1/1974 | Atherton | 428/331 X |
| 3,833,409 | 9/1974 | Peshin | 346/135.1 |
| 4,166,144 | 8/1979 | Amberkar | 428/40 |
| 4,217,596 | 8/1980 | Jung | 346/135.1 |
| 4,358,779 | 11/1982 | Höhn et al. | 346/135.1 |
| 4,376,943 | 3/1983 | Bahr et al. | 346/135.1 |

*Primary Examiner*—Nancy A. B. Swisher
*Attorney, Agent, or Firm*—Barry D. Josephs

[57] ABSTRACT

Electrosensitive recording using a composite structure formed by a base support, a resinous contrast layer containing silicon dioxide and a lubricating agent, and a vapor deposited metallic surface. The electrosensitive substrate provides improved print quality for information recorded by electrically actuated stylii, with reduced debris accumulation.

15 Claims, No Drawings

ELECTROSENSITIVE RECORDING

This is a continuation of Ser. No. 415,106, filed Sept. 7, 1982 now abandoned.

BACKGROUND OF THE INVENTION

1. Field of the Invention

The present invention relates to electrosensitive recording and recording media.

2. Description of the Prior Art

Electrosensitive recording materials typically have a base layer of paper that supports a resinous contrast coating on one side. A further coating of vapor-deposited metal, such as aluminum, covers the free surface of the resinous contrast coating. When electrical current is passed through a stylus in contact with the metallized surface, the metal is vaporized along the path of the stylus; this exposes the contrasting resinous layer. The resinous coating may include additives, such as matting agents to reduce the gloss of the metallized surface, and pigments or dyes to provide a pronounced contrast to the metallic surface where the latter has been removed.

Contemporary printers for electrosensitive material have the disadvantage that print quality hass not been as good as that obtained with competing printers. Another typical disadvantage has been the tendency to accumulate debris around the stylus, necessitating frequent shutdown of the printer for cleaning.

Many printers of this type have conductive grounding rollers which come into contact with the metallic surface of the electrosensitive material to provide electrical grounding for the material and possibly also to assist in feeding the electrosensitive material through the printer. When such printers are operated under high humidity conditions there is a tendency for microscopic portions of the metallic surface and underlying resinous coating layer to accumulate on the grounding rollers, ultimately leading to deterioration in print quality upon prolonged operation. The mechanism by which minor amounts of debris transfer to the ground rollers is not known with certainty. Occasional misfiring of the stylus because of a high metallic surface smoothness can be a contributing cause. It is also theorized that a retention of moisture on the metallic surface of the electrosensitive material occurring during operation in a high humidity environment especially when the metallic surface has a high degree of smoothness may increase friction or surface adhesion between the ground rollers and metallic surface aggravating the above problems.

In the development of electrosensitive paper for use as a recording medium in computer output printers, it has not heretofore been possible to produce a reasonably priced electrosensitive paper which could meet a large number of physical requirements. Among the most important properties of interest are tensile and tearing strength, burst strength, fingerprinting resistance, resistivity, barrier properties, minimal structural curling, matte appearance, print quality and limited production of debris during recording. It is also important that the electrosensitive paper not cause appreciable stylus wear.

Representative electrosensitive recording papers of the prior art comprise a paper base layer covered by a contrast layer of a lacquer coating or printing ink, which in turn is covered by metallic aluminum. Illustrative prior art patents include U.S. Pat. Nos. 3,786,518; 3,831,179; 3,995,083; 4,217,596; and 3,620,831; 2,833,677; 3,657,721; 3,861,952; and 4,024,546.

In U.S. Pat. No. 3,831,179 an intermediate contrast layer of cellulose-based lacquer is used to produce corrosion resistance and has good barrier properties in that it prevents moisture vapor from being transmitted through the paper base layer. This structure has the disadvantage that the contrast of the exposed resinous layer where the metallic surface is burned away is not satisfactory.

Numerous attempts have been made to improve the contrast between the recorded information and the outer metallic layer of the electorsensitive medium. Typically, carbon black pigment is added to the intermediate lacquer layer to produce a matting effect in an attempt to improve contrast. Such is the case in U.S. Pat. No. 3,995,083.

In U.S. Pat. No. 3,786,518, an amorphous silicon oxide additive is added to enhance the matte properties of the intermediate lacquer layer. This is to improve the contrast between the recorded information and an aluminum coating. Although amorphous silicon oxide reduces gloss so as to improve contrast, it alone does not prevent rapid buildup of debris around the stylus. Buildup of debris around the stylus detracts from print quality and necesssitates frequent shutdown of the printer for cleaning as noted in U.S. Pat. No. 4,217,596. Because of the disadvantages of silicon dioxide, an alternative additive is suggested in U.S. Pat. No. 4,217,596 in the form of a combustible organic matte-causing substance, preferably polysstyrene or polyethylene. The use of an organic, combustible matte-producing additive has the advantage over silicon oxide that practically no deposits will occur on the writing electrodes. Unlike silicon oxide, the organic matte-causing additive is burnt off upon recording. The result is very little, if any, residue around the electrodes. But organic matte-producing additives have the disadvantage of producing a diminished contrast.

Accordingly, it is a primary object of the present invention to provide electrosensitive recording media which permit prolonged operation of an electrosensitive printer. A related object is the avoidance of debris buildup on the stylii of such printers. It is particularly desirable to achieve these results under high humidity conditions.

It is another object of the present invention to provide improved contrast in electrosensitive recording materials.

A further object of the invention is to reduce the wear on the recording stylii used with electrosensitive materials.

Yet another object of the invention is to provide economical electrosensitive recording media satisfying an array of physical criteria, including for example printability, strength, and flexibility.

SUMMARY OF THE INVENTION

In accomplishing the foregoing and related objects, the invention provides an electrosensitive recording medium having a metallic surface and an intermediate contrast coating layer composed of a film forming resin and colorant supplemented by a lubricating agent and a filler. The filler includes a silica or silicate of acicular particle shape or particles having sharp, jagged edges. The filler preferably also includes amorphous silica having relatively smooth surface texture. The formulation achieves improved printability, contrast characteristics, and reduces the retention of debris deposits on the metallic surface during recording. The formulation also reduces the change of misfiring of the electrical stylus while preventing buildup of debris deposits on electrical ground rollers.

Applicants have determined that a lubricating agent having both lubricating and hydrophobic properties when included in the contrast coating retards the rate of accumulation and retention of debris deposits on the electrical ground rollers. This effect has unexpectedly been markedly improved when the resinous coating also includes a silica or silicate particulate filler of acicular shape or having sharp, jagged edges. The silica or silicate having such form is hereinafter conveniently referred to acicular silica or silicate, i.e. particulate silica or silicate having an acicular or needle-like shape, or of other overall form but having sharp, jagged edges. The presence of the acicular silica or silicate particles has been determined to provide the metallic surface with a texture having a pattern of surface irregularities composed of microscopic peaks and valleys. This irregular surface texture increases the surface roughness which in turn permits the stylus to operate consistently without misfiring.

Applicant theorizes that consistent firing of the stylus is a contributing factor in achieving the desired retardation in rate of debris accumulation on the ground rollers.

The acicular silica or silicate preferably has a hardness in a range between about 3.0 to 8.0 in the Moh scale, more preferably between about 4.5 to 5.0. The average particle size of the acicular silica or silicate advantageously is of the order 2.0 to 8.0 microns, typically about 3.5 microns. In addition to the foregoing, the acicular silica or silicate has been determined to be sufficiently abrasive to promote a scraping away of debris which may otherwise accumulate on the stylus itself and consequently interfere with print quality.

Additionally, amorphous silica, preferably having smooth surfaces can be advantageously admixed with the acicular silica to obtain a desired degree of surface roughness and simultaneously reduce the metallic gloss.

A silica source which has been determined to be particularly suitable is diatomaceous earth. The silicates may include any naturally occurring silicates or minerals rich in silicates having the requisite hardness and acicular particle features. For examople, asbestos (magnesium silicate) or feldspar (potassium aluminum silicate) could be employed. Wollastonite, a naturally occurring mineral composed principally of calcium silicate ($CaSiO_3$), is particularly suitable in the present invention.

Applicants have determined that the lubricating agent suitable for admixture in the resinous coating, particularly in admixture with a filler containing acicular silica or silicates should enhance lubricity and simultaneously prevent penetration of moisture into the resinous coating. The lubricating agent functions in combination with the acicular silica or silicate to maintain print quality, particularly under high humidity conditions.

Suitable lubricating agents having the above-mentioned properties which can be admixed into the resinous coating layer including fatty acids composed of saturated or unsaturated carboxylic acids having a carbon content between $C_4$ to $C_{22}$, preferably between $C_{12}$ to $C_{22}$, as well as metallic salts of such fatty acids. Preferred saturated fatty acids in this class are stearic, palmitic, and lauric acids the first being most preferred. Preferred unsaturated fatty acids include oleic and linoleic acids. Metallic salts of any of the above $C_4$ to $C_{22}$ fatty acids for use in admixture in the contrast coating 12 may have the metallic ion component selected preferably from aluminum, zinc, and calcium. A particularly suitable metallic salt is aluminum stearate. Other metallic ion components for any of the $C_4$–$C_{22}$ fatty acid metallic salts include nickel, copper, cobalt, lithium, tin, iron, magnesium, sodium potassium and cadmium. Any of the above class of fatty acids may be used alone or in any combination. The metallic salts of these acids may be used alone or in combination with each other or in combination with any of the above referenced $C_4$–$C_{22}$ fatty acids, preferably the $C_{12}$–$C_{22}$ fatty acids.

The above-referenced silica or silicate fillers and lubricating agents may be admixed with any film forming polymer resin. The weight ratio of total silica or silicate filler to film forming resin (dry basis) is advantageously between about 0.2/1 and 0.8/1. The lubricating agent advantageously comprises between about 3 to 30 percent by eight of the dry coating contrast layer, preferably between about 5 to 15 percent.

DESCRIPTION OF THE DRAWINGS

Other aspects of the invention will become apparent after considering several illustrative embodiments of the invention taken in conjunction with the drawings in which:

FIG. 1 is a perspective view of an illustrative electrosensitive substrate in accordance with the invention imprinted with an electrically actuated stylus; and FIG. 2 is a cross section of the substrate of FIG. 1.

DETAILED DESCRIPTION

With reference to the drawings, an electrosensitive recording medium 10 in accordance with the invention includes a base or support member 11, a contrast layer 12 uniformly coated on the base paper, and a vapor-deposited coating 13 of aluminum, which coverss the upper surface **12*u* of the contrast layer 12. Although aluminum is preferred for the vapor deposited coating 13**, other materials may be used such as cadmium, nickel, or oxides of aluminum.

The medium 10 is employed in electrosensitive recording, using for example an electrically actuatable stylus 50 with a tip 55 in contact with the metallic outer surface **13*s* of the medium 10, which takes the form of a strip in FIG. 1. The stylus 50 is moved over the surface 13*s* in the direction indicated by arrows A and B and electrically actuated to selectively burn away or vaporize the surface 13*s* in accordance with the information 14** to be recorded.

The contrast coating layer 13 is comprised of a film-forming resin, colorant, lubricating agent and a filler. The filler includes silica or silicate particles of acicular shape or having sharp, jagged, acicular edges. The combination of the acicular shaped or acicular silica or silicates along with amorphous silica, preferably an amorphous silica having relatively smooth surfaces, enhances the surface roughness while simultaneously reducing the degree of metallic gloss. The acicular silica or silicates preferably have a hardness of between about 3.0 to 8.0, typically about 4.5 as measured on the Moh scale. The weight ratio of acicular silica or acicular silicate to amorphous silica advantageously falls within a range between about 0.5/1 and 2.0/1. The particle size of the acicular shaped silica or silicate may typically be between about 2.0 and 8.0 microns and the particle size of the amorphous silica between about 2.0 and 9.0 microns. The abrasiveness of the filler may be increased if desired by adding very small amounts of crystalline silica preferably having acicular edges, particularly crystalline silica having a higher order hardness typically of about 7.0 on the Moh scale. A preferred crystalline silica of this type is available under the tradename MIN-U-SIL 15 from Pennsylvania Glass Sand Corp. of Pittsburgh, Pa.

If crystalline silicon dioxide is added, it is desirably present in an amount such that the weight ratio of crystalline silicon dioxide to acicular silica or acicular silicate is at least about 0.01/1 and preferably in a range between about 0.01/1 to 0.1/1.

The acicular silica or silicates may include any silica within the range of hardness preferably between about 3.0 to 8.0 on the Moh scale and having acicular particle shape. One preferred silica meeting these requirements is diatomaceous earth. Suitable diatomaceous earth is commercially available under the tradename Celite 266 from the Manville Corp. of Denver, Colo. The silicates may include any naturally occurring silicates or minerals rich in silicates having the requisite hardness and acicular particle features. Two minerals which are suitable are asbestos (magnesium silicate) or feldspar (potassium aluminum silicate). A preferred silicate meeting the requisite hardness and acicular particle feature has been determined to be the mineral wollastonite, a naturally occurring mineral composed principally of calcium metasilicate ($CaSiO_3$). A mineral of this type is available under the tradename NYAD-400 wollastonite from Nyco Division of Processed Minerals, Inc. of Essex County, N.Y. This product is commercially available as a pure white mineral that has a wholly acicular particle shape. The average particle diameter of the NYAD wollastonite is about 3.5 microns and the typical particle length to diameter ratio is between about 3/1 to 20/1. A preferred amorphous silica having relatively smooth surfaces is available under the tradename Syloid 378 from W. R. Grace & Co., Davison Chemical Division of Baltimore, Md.

The combination of acicular silica or acicular silicate filler and lubricating agent admixed into contrast coating layer 12 have unexpectedly been found to simultaneously retard the chance of the stylus misfiring and also retard the rate of accumulation of debris on both the stylus and electrical ground rollers.

Lubricating agents which have been determined to achieve these desired results in combination with the silica filler include fatty acids composed of saturated or unsaturated carboxylic acids having a carbon content between $C_4$ to $C_{22}$, preferably between $C_{12}$ to $C_{22}$ and/or metallic salts of such fatty acids. Fatty acids in this class or their metallic salts exhibit both lubricating and hydrophobic properties which are believed to contribute to the attainment of the aforementioned desirable results in combination with acicular silica or acicular silicate filler. Preferred saturated fatty acids for the lubricating agent are stearic, palmitic and lauric acid, more preferably stearic acid. Preferred unsaturated fatty acids are oleic and linoleic acids. Preferred metallic salts of any of the $C_4$–$C_{22}$ fatty acids for use as a lubricating agent in the contrast coating layer 12 may have the metallic ion component of the salt selected from aluminum, zinc and calcium. Aluminum stearate is a particularly suitable metallic salt. The $C_4$–$C_{22}$ fatty acid metallic salt, preferably a $C_{12}$–$C_{22}$ fatty acid metallic salt may be composed of other metallic ions typically nickel, copper, cobalt, lithium, tin, iron, and magnesium. The above class of saturated or unsaturated fatty acids may be employed alone or in combination with each other. Alternatively, lubricating agents may be composed of above-enumerated metallic salts of these fatty acids employed alone or in combination with each other or in combination with any of the fatty acids. A preferred metallic salt used alone is aluminum stearate and a preferred combination of metallic salt and fatty acid is aluminum stearate and stearic acid.

The film forming resin included in the contrast coating layer 12 may be any film forming resin. For example, the film forming resin may include ethyl cellulose, polyethylene, nitrocellulose, polyvinyl acetate, cellulose acetate, polyvinyl chloride, copolymers of vinyl chloride and vinyl acetate, cellulose acetate butyrate, methylmethacrylate, methylacrylate, ethylacrylate, butylacrylate, polystyrene, copolymers of styrene and maleic acid, copolymers of styrene and acrylic acid and copolymers of vinyl ether and maleic acid. Although a wide variety of film forming resins may be suitable in the context of the present invention, vinyl acetate is the resin of choice.

It has been determined that the weight ratio of total filler to form forming resin (dry basis) is preferably between about 0.2/1 to 0.8/1. The lubricating agent is advantageously present in the dry contrast coating layer 12 in an amount between about 3 to 30 percent by weight, preferably between about 5 to 15 percent by weight of the dry contrast coating layer.

In addition to achieving the aforementioned desirable results, the electrosensitive recording media of the present invention is economically manufactured and satisfies an array of physical criteria including high print quality, strength, flexibility, reduced metallic gloss, and resistance to fingerprinting.

Preferred formulations for the contrast layer are set forth in Tables I, II, and III. The formulations shown in these tables contain a film-forming resin such as vinyl acetate, a filler which includes acicular particles of silica or silicate, a hydrophobic lubricating agent, and suitable solvents in the proportions set forth in the respective tables.

The black dye may preferably be a nigrosine base dye available from American Cyanamid Corporation of Boundbrook, N.J. Alternatively, carbon black may be used in combination with or instead of nigrosine base dye. The preferred solvents are ethanol, ethoxyethanol, toluene, and ethyl acetate. The ethoxyethanol is availabe under the trademark ethyl-Cellosolve from Union Carbide Corporation, New York, N.Y. It will be appreciated that other volatile solvents for the polymer resin vinyl acetate are equally suitable.

Once formulated, the liquid contrast coating as shown in the three Tables, I, II, and III is applied to a base paper sheet and dried by conventional convective heaters to evaporate the solvents, producing a dry contrast coating layer having the composition shown in each one of the respective tables. A metallic layer such as aluminum is then vapor deposited on the free surface of the dry contrast coating layer to produce the electrosensitive paper product.

The electrosensitive paper product of the invention with a contrast coating layer utilizing the specific formulations in Tables I, II, or III exhibits excellent print contrast characteristics. It also exhibits marked reduction in the accumulation of debris deposits around each stylus. In test runs using electrosensitive paper having a contrast layer in accordance with either formulation set forth in Tables I, II and III at least eighteen rools and typically thirty rolls (235 ft. per roll) of the electrosensitive paper could be passed through the printer before there was sufficient wear on the stylus and/or sufficient debris accumulation to interfere with the acceptable level of print quality.

In addition, the electrosensitive paper product of the invention which includes a filler and lubricating agent in the contrast coating layer as shown in the specific formulations set forth in Tables I, II, or III prevents contamination or fouling of metallic rollers which may be in contact with the aluminum layer 13 during the printing process. If printers with metallic ground rollers are employed in printing the electrosensitive paper product of the invention having contrast coating formulations as set forth in Tables I, II, or III, the transfer of aluminum or other debris onto the metallic rollers is not significant enough to interfere with the electrical grounding of the electrosensitive paper, even during operation of the printer under relatively high humidity conditions. For example, under environmental conditions having relative humidity of about 80 percent at about 80° F., as many as up to 200 rolls or considerably more electrosensitive product can be printed (235 ft./roll) with conventional electrosensitive printers employing ground rollers in contact with the metallic layer of the electrosensitive product without resulting in interference with the electrical grounding contact significant enough to noticeably impair print quality.

Additionally, electrosensitive recording paper in accordance with the invention has a number of other important physical characteristics making the paper particularly suitable as a recording medium for electrosensitive printers. In addition to improved contrast print quality, significantly reduced debris accumulation, and lack of interference with proper electrical grounding, other improved physical characteristics include strength, gloss, moisture vapor transmission rate, fingerprint resistance, electrical resistivity, bursting strength, tear strength, and flexibility, all of which are significant for print media used with computer printer output terminals.

Typical physical characteristics of electrosensitive paper made in accordance with the formulations of Table I, II, or III are summarized in Table IV, in which the actual physical characteristics of the electrosensitive paper of the invention are compared with preferred physical property specifications. It is readily observed from Table IV that the electrosensitive paper of the invention has physical characteristics well within the required range for each one of the specification standards tabulated in Table IV.

TABLE I

| | Comp. Wt. % |
|---|---|
| Liquid Contrast Coating-Formulation I | |
| Solvent 1 | |
| Ethanol | 14.1 |
| Solvent 2 | |
| Ethoxyethanol (e.g. ethyl-CELLOSOLVE) | 9.7 |
| Solvent 3 | |
| Toluene | 21.8 |
| Solvent 4 | |
| Ethyl Acetate | 31.5 |
| Polymer Resin | |
| Vinyl Acetate (acid no. 20) | 12.2 |
| Dye Black[1] | |
| Nigrosine Base | 3.0 |
| Lubricant Agent | |
| Stearic Acid | 1.7 |
| Filler | |
| Amorphous Silicon Dioxide (e.g. SYLOID 378) | 3.0 |
| Acicular Silicate Wollastonite Mineral (e.g. NYAD - 400) | 3.0 |
| | 100.0 |
| Dried Contrast Coating-Formulation I | |
| Polymer Resin | |
| Vinyl Acetate | 53.2 |
| Dye Black | |
| Nigrosine Base | 13.1 |
| Lubricating Agent | |
| Stearic Acid | 7.5 |
| Filler | |
| Amorphous Silicon Dioxide (e.g. SYLOID 378) | 13.1 |
| Acicular Silicate Wollastonite mineral (e.g. NYAD - 400) | 13.1 |
| | 100.0 |

[1]Carbon black may be used in combination with or instead of Nigrosine Base.

TABLE II

| | Comp. Wt. % |
|---|---|
| Liquid Contrast Coating-Formulation II | |
| Solvent I | |
| Ethanol | 17.4 |
| Solvent 2 | |
| Ethoxyethanol (e.g. ethyl-CELLOSOLVE) | 9.8 |
| Solvent 3 | |
| Toluene | 28.8 |
| Solvent 4 | |
| Ethyl Acetate | 19.3 |
| Polymer Resin | |
| Vinyl Acetate (acid no. = 60) | 13.0 |
| Dye Black[1] | |
| Nigrosine Base | 3.0 |
| Lubricant Agent | |
| Aluminum Stearate | 1.5 |
| Stearic Acid[2] | 0.2 |
| Filler | |
| Amorphous Silicon Dioxide (e.g. SYLOID 378) | 4.0 |
| Acicular Silicate Wollastonite Mineral (e.g. NYAD - 400) | 3.0 |
| | 100.0 |

[1]Carbon black may be used in combination with or instead of Nigrosine Base.
[2]Stearic Acid may be omitted.

| | |
|---|---|
| Dried Contrast Coating-Formulation II | |
| Polymer Resin | |
| Vinyl Acetate | 52.7 |
| Dye Black | |
| Nigrosine Base | 12.1 |
| Lubricating Agent | |
| Aluminum Stearate | 6.1 |
| Stearic Acid[1] | 0.8 |
| Filler | |
| Amorphous Silicon Dioxide (e.g. SYLOID 378) | 16.2 |
| Acicular Silicate Wollastonite Mineral (e.g. NYAD - 400) | 12.1 |

TABLE II-continued

| | Comp. Wt. % |
|---|---|
| | 100.0 |

[1]Stearic Acid may be omitted.

TABLE III

| | Comp. Wt. % |
|---|---|
| Liquid Contrast Coating-Formulation III | |
| Solvent 1 | |
| Ethanol | 17.4 |
| Solvent 2 | |
| Ethoxyethanol (e.g. ethyl-CELLOSOLVE) | 9.8 |
| Solvent 3 | |
| Toluene | 28.8 |
| Solvent 4 | |
| Ethyl Acetate | 19.3 |
| Polymer Resin | |
| Vinyl Acetate (acid no. = 60) | 14.9 |
| Dye Black[1] | |
| Nigrosine Base | 3.0 |
| Lubricating Agent | |
| Aluminum Stearate | 1.5 |
| Stearic Acid[2] | 0.2 |
| Filler | |
| Amorphous Silicon Dioxide (e.g. SYLOID 378) | 2.0 |
| Acicular Edged Silica or Silicate Diatomaceous Earth (e.g. CELITE 266) | 3.0 |
| Crystalline Silicon Dioxide (e.g. MIN-U-SIL 15) | 0.1 |
| | 100.0 |
| Dried Contrast Coating-Formulation III | |
| Polymer Resin | |
| Vinyl Acetate | 60.4 |
| Dye Black | |
| Nigrosine Base | 12.1 |
| Lubricating Agent | |
| Aluminum Stearate | 6.1 |
| Stearic Acid | 0.8 |
| Filler | |
| Amorphous Silicon Dioxide (e.g. SYLOID 378) | 8.1 |
| Acicular Edged Silica or Silicate Diatomaceous Earth (e.g. CELITE 266) | 12.1 |
| Crystalline Silicon Dioxide (e.g. MIN-U-SIL) | 0.4 |
| | 100.0 |

[1]Carbon black may be used in combination with or instead of Nigrosine Base.
[2]Stearic Acid may be omitted.

TABLE IV

PHYSICAL PROPERTY TEST RESULTS

| | Typical Test Results For Product As In Table I and II | Minimum Required For Use In Computer Output Printers |
|---|---|---|
| Paper Base Layer, LBS./REAM (3,000 sq. ft.) | 35 | 32 |
| Contrast Coating Layer, LBS./REAM (3,000 sq. ft.) | 2.5 | 1.4 |
| Aluminum Layer, surface resistance ohms | 2.0 | 1.5 to 3.0 |
| Roughness (Aluminum Layer), Sheffield Smoothness Test | 70 | 25 to 100 |
| Whiteness Index, % Hunter Colorimeter (ASTM E313) | 83 | 70 |
| Gloss, % Percent reflectance measured at 60° angle of incidence with Hunter Gloss Meter. | | |
| Machine Direction | 10 | Less than 40 |
| Cross Direction | 9 | Less than 40 |
| Fingerprinting, % | 70 | 65 |
| A sample coated with vacuum pump oil was allowed to stand for 35 minutes and its reflectance was compared with that of an unoiled sample using an opacimeter. | | |
| Structural curl, mm | | |
| At 20% Relative Humidity | 8 | Less than 30 |
| At 75% Relative Humidity | 16 | Less than 30 |
| Burst Strength, Kilopascal Mullen Test | 120 | 100 |
| Resistance to Tear, gms. TAPPI TEST T414 | | |
| Machine Direction | 41 | Less than 60 |
| Cross Direction | 54 | Less than 60 |
| Print Quality | VERY GOOD PRINT QUALITY AND CONTRAST | — |
| Run Length of Electro-sensitive Paper Before Print Head (Stylus) Wears Down. | 18 to 30 rolls (4,230 ft. to 7,050 ft.) | 18 |
| Run Length of Electro-sensitive Paper with Printer Having Ground Roller Before Ground Roller Becomes Contaminated with Debris At 80° F. and 80 percent | At least up to 200 rolls | 100 |

TABLE IV-continued

| PHYSICAL PROPERTY TEST RESULTS | Typical Test Results For Product As In Table I and II | Minimum Required For Use In Computer Output Printers |
|---|---|---|
| relative humidity. | (47,000 ft.) | |

Methods of manufacturing electrosensitive paper using the contrast coatings of Tables I, II, or III are set forth in the following non-limiting example:

EXAMPLE

A batch of liquid contrast coating is prepared as a homogeneous dispersion by mixing all the constituents with a low shear mixer in accordance with the proportions set forth in Tables I, II, or III. The homogeneous dispersion is formed preferably by adding the constituents gradually to a mixing vessel in the following sequence while forming the mixture under continual agitation: Solvent 1, Solvent 2, Solvent 3, Solvent 4, Lubricant, Fillers, Dye Black and Polymer Resin. After all the constituents have been added to the vessel, the mixing is continued with the low shear mixer for a period of about 30 to 60 minutes until a uniform dispersion is achieved forming the liquid contrast coating having the composition as set forth in Tables I, II, or III, respectively.

The resulting liquid contrast coating is applied directly to the paper layer or is first diluted with a 60/40 mixture of toluene and ethylacetate to bring the coating mixture to a preferred coating viscosity equal to a flow time of about 17 to 25 seconds as measured with a #2 Zahn cup. This preferred coating viscosity permits easier and more efficient application of the liquid contrast coating and results in a smoother coating when using a three roll reverse roller.

The coating mixture is uniformly applied to one side of a chemically pulped sheet paper having a basis weight of about 35 lbs/ream (3,000 sq. ft. per ream) by conventional three-roll reverse roller to achieve a contrast coating layer having a basis weight of between about 1.5 to 3.0 lbs/ream (3,000 sq. ft. per ream). Although chemically pulped free sheet paper is preferred other types of paper such as kraft or ground-wood sheet may be used, which preferablky may be pretreated to lessen absorption of the coating into the internal structure of the paper. The basis weight of the paper may typically be between about 20 to 40 lbs. per ream (3,000 sq. ft. per ream). The coating is then dried by conventional paper coating driers with hot air at successively higher temperatures from 100° to 400° F. The drying time is preferably between about 10 seconds and 1 minute. Upon drying the solvents are evaporated resulting in the dried contrast coating having a composition as shown in the respective Tables I, II or III.

Pure aluminum (99.7% pure) is then vapor-deposited onto the outer surface of the coating layer by conventional high vacuum metallization. The result is an electrosensitive paper product having the typical physical properties set forth in Table IV including a metallic surface resistance of between about 1.3 to 2.5 ohms per square slab. The metallic surface resistance is equivalent to the metal resistivity divided by the metallic layer thickness.

When the resulting electrosensitive paper product was tested, at least 18 rolls (235 ft. per roll) and typically 30 rolls could be passed through the printer before there was significant stylus wear and/or enough debris accumulation to significantly affect print quality and require shutdown of the printer for cleaning and/or stylus replacement.

Furthermore, there was essentially no buildup of aluminum or other debris deposits on the ground roller or feed rollers of the printer significant enough to adversely affect the print quality upon prolonged use of the printer even under humid conditions of 80 percent relative humidity at 80° F.

It will be appreciated that other formulations for the contrast coating may be utilized and the electrosensitive paper product prepared in a manner similar to that set forth in the above example without departing from the spirit and scope of the invention.

We claim:

1. An electrosensitive recording material comprising:

(a) a support, (b) a coating layer upon said support comprising a film-forming resin, a hydrophobic lubricating agent, and a filler selected from the class consisting of acicular particles of silica and acicular particles of silicates, said acicular particles having a hardness on the MOH scale of betweem about 3.0 and 8.0, said filler further comprising amorphous silicon dioxide, wherein said acicular particles have an average particle size between about 2.0 and 8.0 microns and the amorphous silicon dioxide has an average particle size of between about 2.0 and 9.0 microns, said hydrophobic lubricating agent selected from the class consisting of an organic $C_4$ to $C_{22}$ fatty acid and the metal salt of an organic $C_4$ to $C_{22}$ fatty acid, and (c) a metallic layer vapor-deposited upon said coating layer, wherein the surface of said metallic layer is vaporized selectively along points of contact of a stylus on the metallic layer as said stylus is electrically activated thereon exposing points of the underlying coating layer (b) forming a visual recording on the surface of the electrosensitive recording material.

2. An electrosensitive recording material as in claim 1 wherein the metallic ion is selected from the group of metals consisting of aluminum, zinc, nickel, copper, cobalt, lithium, tin, iron, calcium, magnesium, sodium, potassium and cadmium.

3. An electrosensitive recording material comprising:

(a) a base member, (b) a coating layer upon said base member comprising a film-forming resin, a hydrophobic lubricating agent, and a filler comprising an acicular silicate having a hardness on the MOH scale between about 3.0 and 8.0, said acicular silicate comprising the mineral wollastonite, said filler further comprising amorphous silicon dioxide, said hydrophobic lubricating agent selected from the class consisting of an organic $C_4$ to $C_{22}$ fatty acid, and (c) a metallic layer vapor-deposited upon said coating layer, wherein the surface of said metallic layer is vaporized selectively along points of contact of a stylus on the metallic layer as said stylus is electrically activated thereon exposing points of the underlying coating layer (b) forming a visual recording on the surface of the electrosensitive recording material.

4. An electrosensitive recording material as in claim 3 wherein the weight ratio of acicular silica or acicular silicates to amorphous silicon dioxide is in a range between about 0.5/1 to 2.0/1.

5. An electrosensitive recording material as in claim 3 wherein the acicular particles of silica or acicular particles of silicates have an average particle size between about 2.0 to 8.0 microns and the amorphous silicon dioxide has an average particle size of between about 2.0 to 9.0 microns.

6. An electrosensitive recording material as in claim 3 wherein the metallic ion is selected from the group of metals consisting of aluminum, zinc, nickel, copper, cobalt, lithium, tin, iron, calcium, magnesium, sodium, potassium and cadmium.

7. An electrosensitive recording material as in claim 3 wherein the coating layer has a basis weight of between about 1.5 to 3.0 lbs./ream.

8. An electrosensitive recording material as in claim 3 wherein the base layer is comprised of paper.

9. An electrosensitive recording material as in claim 3 wherein the metallic layer is comprised of vapor deposited aluminum having a surface resistance of between about 1.0 to 3.0 ohms.

10. An electrosensitive recording material as in claim 3 wherein said coating layer includes nigrosine base dye black.

11. An electrosensitive recording material comprising:

(a) a base member, (b) a coating layer upon said base member comprising a film-forming resin, a hydrophobic lubricating agent, and a filler comprising an acicular silica having a hardness on the MOH scale of between about 3.0 and 8.0, said acicular silica comprising diatomaceous earth, said filler further comprising amorphous silicon dioxide, wherein said acicular particles have an average particle size between about 2.0 and 8.0 microns and the amorphous silicon dioxide has an average particle size of between about 2.0 and 9.0 microns, said hydrophobic lubricating agent selected from the class consisting of an organic $C_4$ to $C_{22}$ fatty acid, and (c) a metallic layer vapor-deposited upon said coating layer, wherein the surface of said metallic layer is vaporized selectively along points of contact of a stylus on the metallic layer and said stylus is electrically activated thereon exposing points of the underlying coating (b) forming a visual recording on the surface of the electrosensitive recording material.

12. An electrosensitive recording material as in claim 3 wherein the filler further comprises crystalline silicon dioxide having a hardness of at least about 7 on the Moh scale.

13. An electrosensitive recording material as in claim 12 wherein the weight ratio of crystalline silicon dioxide to amorphous silicon dioxide is in a range between about 0.01/1 and about 0.10/1.

14. An electrosensitive recording material as in claim 3 wherein the lubricating agent comprises between about 3 to 30 percent by weight of the coating layer (dry basis).

15. An electrosensitive recording material as in claim 3 wherein the weight of the filler comprises between about 20 to 80 percent that of the film forming resin.

* * * * *